United States Patent
Heimler et al.

(10) Patent No.: US 12,073,264 B2
(45) Date of Patent: Aug. 27, 2024

(54) DECOMPOSITION OF RESOURCE DISCOVERY ROLES, PARTS, AND TRANSPORT MODESLC

(71) Applicant: SAP SE, Walldorf (DE)

(72) Inventors: Simon Heimler, Coswig (DE); Steffen Goebel, Dresden (DE); Ralf Hofmann, Hamburg (DE)

(73) Assignee: SAP SE, Walldorf (DE)

( * ) Notice: Subject to any disclaimer, the term of this patent is extended or adjusted under 35 U.S.C. 154(b) by 36 days.

(21) Appl. No.: 17/544,565

(22) Filed: Dec. 7, 2021

(65) Prior Publication Data

US 2023/0176931 A1    Jun. 8, 2023

(51) Int. Cl.
*G06F 3/00* (2006.01)
*G06F 9/54* (2006.01)

(52) U.S. Cl.
CPC .............. *G06F 9/541* (2013.01); *G06F 9/547* (2013.01)

(58) Field of Classification Search
CPC ........................................................ G06F 9/541
USPC ............................................................ 719/328
See application file for complete search history.

(56) References Cited

U.S. PATENT DOCUMENTS

| | | | | |
|---|---|---|---|---|
| 8,744,956 B1 * | 6/2014 | DiChiara | ............... | H04L 63/126 705/37 |
| 10,757,139 B1 * | 8/2020 | Cignetti | ............... | H04L 63/1433 |
| 11,768,889 B1 * | 9/2023 | Smith | ................... | G06F 16/955 707/706 |
| 2004/0193329 A1 * | 9/2004 | Ransom | ................... | H04L 63/20 700/286 |
| 2004/0205585 A1 * | 10/2004 | McConnell | ........... | G06F 40/123 707/999.102 |
| 2006/0253586 A1 * | 11/2006 | Woods | ................ | G06F 16/9535 707/E17.109 |
| 2007/0011130 A1 * | 1/2007 | Yamabuchi | ......... | G06F 16/9574 |
| 2008/0052349 A1 * | 2/2008 | Lin | .................... | H04N 1/00132 718/101 |
| 2010/0299173 A1 * | 11/2010 | Zampiello | ............. | H04W 24/08 705/344 |
| 2013/0024759 A1 * | 1/2013 | Yuan | ................... | G06F 16/9574 715/205 |
| 2014/0289309 A1 * | 9/2014 | Mitchell, Jr. | ......... | H04L 51/066 709/203 |
| 2016/0217147 A1 * | 7/2016 | Boyle | ................. | G06F 16/1815 |
| 2016/0344881 A1 * | 11/2016 | Ando | ................. | H04N 1/00464 |

(Continued)

OTHER PUBLICATIONS

Hala Albaroodi, Critical Review of Openstack Security: Issues and Weaknesses. (Year: 2014).*

(Continued)

*Primary Examiner* — Lechi Truong
(74) *Attorney, Agent, or Firm* — SCHWEGMAN LUNDBERG & WOESSNER, P.A.

(57) ABSTRACT

In an example embodiment, three roles are defined for each of the following: resource discovery: provider, aggregator, and consumer. The provider is the one whose resource information will be shared. Rather than the provider needing to implement the complicated API, however, an aggregator may provide that role. The aggregator defines the API and is able to gather resource information from potentially multiple providers (and also, in some embodiments, other aggregators). The consumer then accesses the aggregator to obtain resource information rather than directly accessing the provider.

15 Claims, 11 Drawing Sheets

(56) References Cited

U.S. PATENT DOCUMENTS

2020/0204640 A1* 6/2020 Li ............................ H04L 67/06
2021/0029197 A1* 1/2021 Kann ....................... H04L 63/12
2021/0119871 A1* 4/2021 Page ................... H04L 41/0894

OTHER PUBLICATIONS

T. Berners-Lee, Uniform Resource Identifier (URI): Generic Syntax. (Year: 2005).*
Jeongseok Seo, Web Server Attack Categorization based on Root Causes and Their Locations. (Year: 2004).*
Paul Barford, Generating Representative Web Workloads for Network and Server Performance Evaluation. (Year: 1998).*

* cited by examiner

DECOMPOSITION OF RESOURCE DISCOVERY ROLES, PARTS, AND TRANSPORT MODESLC

BACKGROUND

Software companies can offer a variety of products and applications that may be integrated in some way with each other (e.g., data may be shared, objects existing in one product may be accessible in another, etc.). It is useful for such systems to have the ability to automatically share software with one another.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
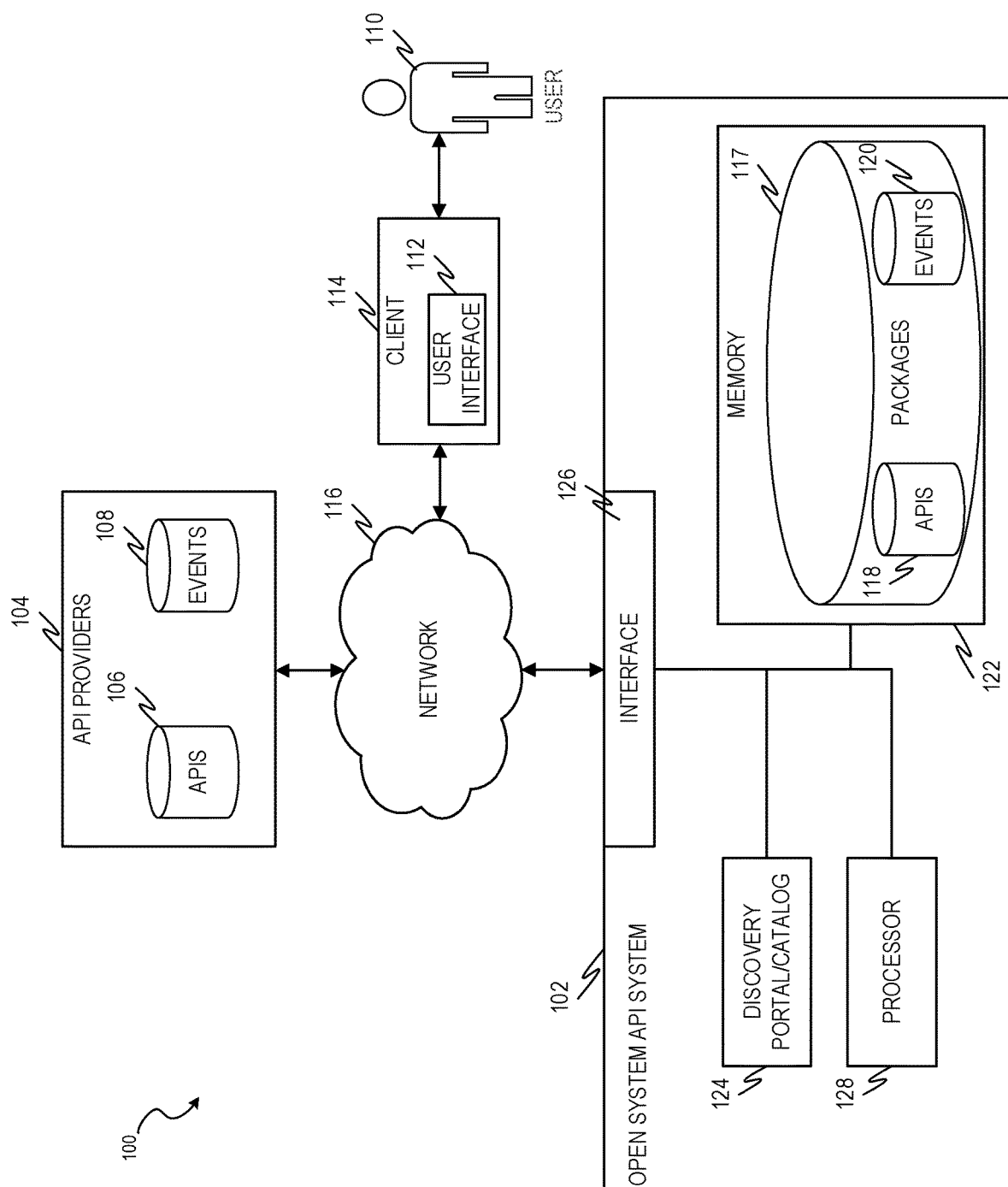
FIG. 1 is a block diagram of an example environment for providing open system APIs, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

One way to implement resource information sharing is to create a system for discovering, representing, and exposing various types of Application Programming Interfaces (APIs).

APIs can include, for example, programming interfaces (including events) that serve as the building blocks to support extensions and integrations from a computer application in a third-party system or language. However, each source system that provides APIs may have different ways to expose the metadata associated with APIs and events. The metadata can define, for example, a library of available APIs and information about what each API does, how the API is called (and used), and what the expected results include. Information about APIs can be provided online, for example, as API libraries or catalogs. However, some systems may not have ways of exposing the metadata regarding their APIs. Without knowing which APIs and events are available from (or exposed by) a system, it can be difficult for software engineers, for example, to build extensions or integrations that use the APIs. Existing conventional approaches involve publishing API metadata can rely on, for example, a) documentation b) custom API catalogs (for example, SAP's Gateway Catalog Service), and c) hypermedia APIs such as OData. Moreover, conventional approaches may not scale easily or may make it difficult to build extensions and integrations in a heterogeneous landscape. Additionally, some tools (such as web integrated development environment (Business Application Strudio or WebIDE), Mobile Software Development Kit (SDK), Cloud Platform Integration, API Management, and Enterprise Messaging), do not have standard ways to discover APIs and events.

Systems that involve the use of APIs are typically heterogeneous. For example, APIs may provide access to data processes and transactions that are distributed across multiple systems. Typically, APIs are exposed as standard APIs, as there is no common view of all the different APIs that are available from multiple systems. Further, there is no one standard way for API providers to expose their APIs, events, and connection information. The present disclosure provides techniques, including a common language, for the discovery of APIs. For example, the Open Resource Discovery specification can standardize information and provide a uniform format used by tools that consume APIs to build applications or perform integration. This can be accomplished, for example, by collecting information about disparate APIs into a central location that presents the information in a standard format to API consumers. The information can then be provided through an Open Resource Discovery document API, for example.

In some implementations, discovery of APIs and related connection information can be performed automatically by machine-driven processes. For example, automated processes can crawl the Internet to obtain information about APIs, the interfaces, and connection information. Information that is obtained can become part of an API catalog that provides information regarding APIs in a standardized way, making the information machine-readable and presentable to users. In some implementations, API providers can provide or publish information about their APIs for inclusion in the API catalog. Machine-readable formats can include, for example, JavaScript Object Notation (JSON).

In some implementations, the API catalog can be implemented as a centralized hub. The centralized hub can allow users to connect to different APIs that may have various (including proprietary) communication protocols. In some implementations, the API catalog can provide aggregated information so that users can obtain access to the APIs that may not be exposable in other ways. For example, some APIs may be in languages that some users are not able to understand. In this example, a common language provided by the API catalog.

The API catalog can provide the following benefits: The discovery and consumption of APIs can be faster than in convention systems in which many different protocols must be learned; Discovery by developer and machines can be supported. Developers can build client libraries and IDE plugins; API owners can more easily engage with and grow their API communities; API consumers can receive API and event definitions with information about the supported authentication and API lifecycle information (e.g., version, latest-version, software version, and deprecation policies); Public APIs can be exposed that do not require authentication to access resources; Taxonomy, interfaces, and services characteristics can be harmonized across various service providers; The harmonization can adhere to the representational state transfer (REST) harmonization guidelines from various groups.

FIG. 1 is a block diagram of an example environment 100 for providing open system APIs, in accordance with an example embodiment. The environment 100 can support, search, discover, explore, and consume capabilities used by users, such a user 110 for accessing APIs 106 and events 108 provided by API providers 104. The user 110 can access the APIs and events using a user interface (UI) 112. The UI 112 can be displayed on a client 114 (for example, a workstation used by the user 110 for application programming). Communications from the client 114 can pass through a network 116 (for example, the Internet and optionally one or more other networks).

The open API system 102 can use packages 117 to represent the APIs 106 and the events 108 of the API providers 104. The packages 117 can include APIs 118 and events 120 that are in a language and format supporting discovery by the users 110. The packages 117 can be included in memory 122, for example, serving as an API catalog. A discovery portal/catalog function 124 of the open API system 102 can perform search, discover, explore, and consume functions needed by the users 110. An interface 126 of the open API system 102 can receive requests received through the network 116 and transmit results in response to the requests. The requests can include API and event information received from the API providers 104. The requests can also include requests received from users, including to search, discover, explore, and consume information related to APIs and events.

The UI 112 can be associated with one or more applications that run on a client 114 (e.g., a mobile device, laptop computer, or other computing device) to interact with the open API system 102. The network 116 can support communication among the components of the environment 100. A processor 128 can execute instructions of modules and other components of the open API system 102.

Figure 2:
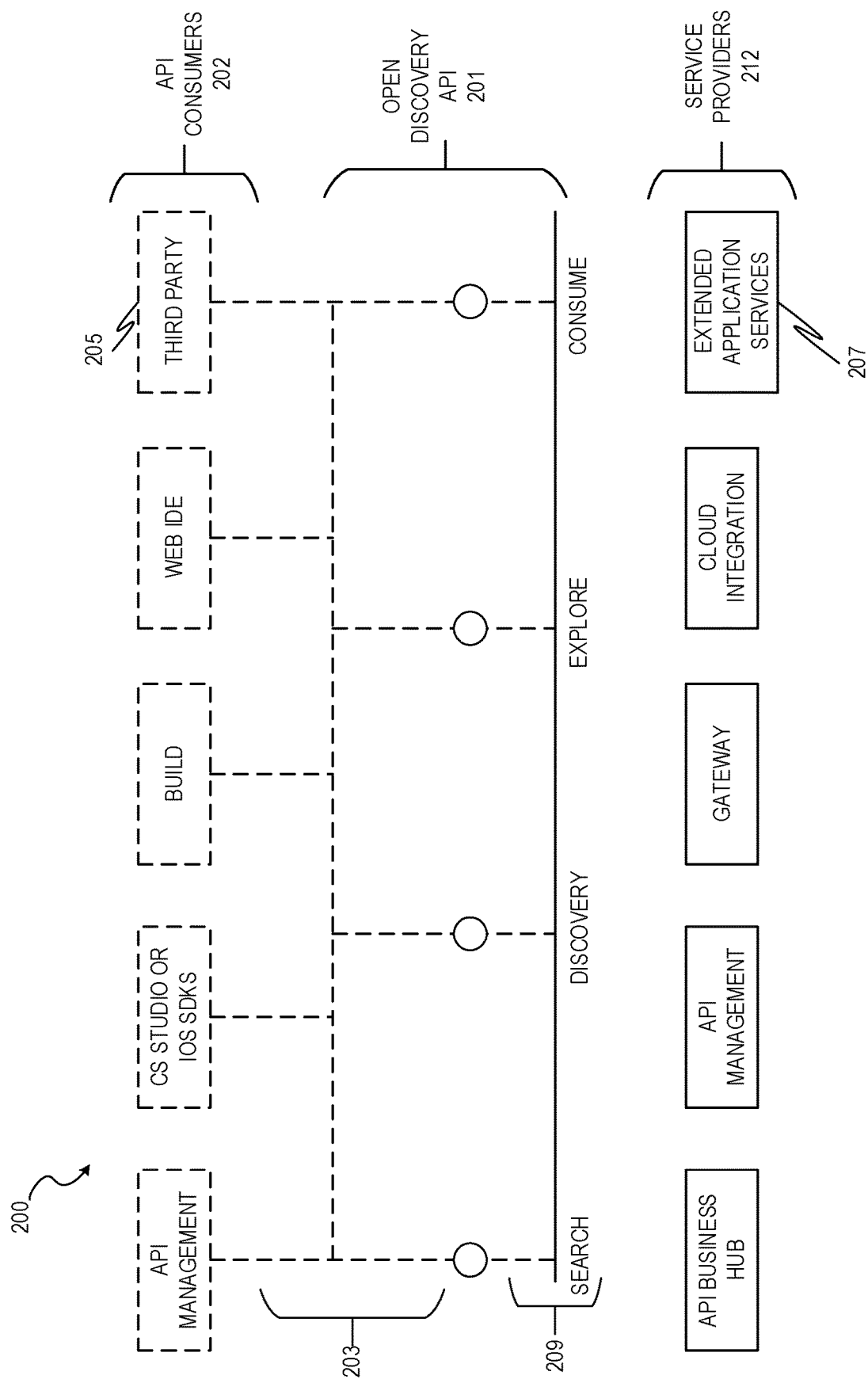
FIG. 2 is a block diagram of an example of an open consumer/provider architecture using open discovery API capabilities, in accordance with an example embodiment.

FIG. 2 is a block diagram of an example of an open consumer/provider architecture 200 using open discovery API capabilities, in accordance with an example embodiment. The open discovery API 201 provides a communication protocol 203 that is a simplified and standardize way for the API consumers 202 to discover and communicate with the API providers 212. This is an improvement over the several different communication protocols 222. The open consumer/provider architecture 200 also allows third-party consumers 205 to discover and communicate with the service providers 212. The open discovery API 201 also facilitates access to extended application services 207. The extended application services 207 can include, for example, an advanced model platform for the development and execution of micro-service-oriented applications that take advantage of in-memory architecture and parallel execution capabilities provided by the extended application services 207. The open discovery API 201 can support developer and UI functions 209 including search, discover, explore, and consume capabilities.

Figure 3:
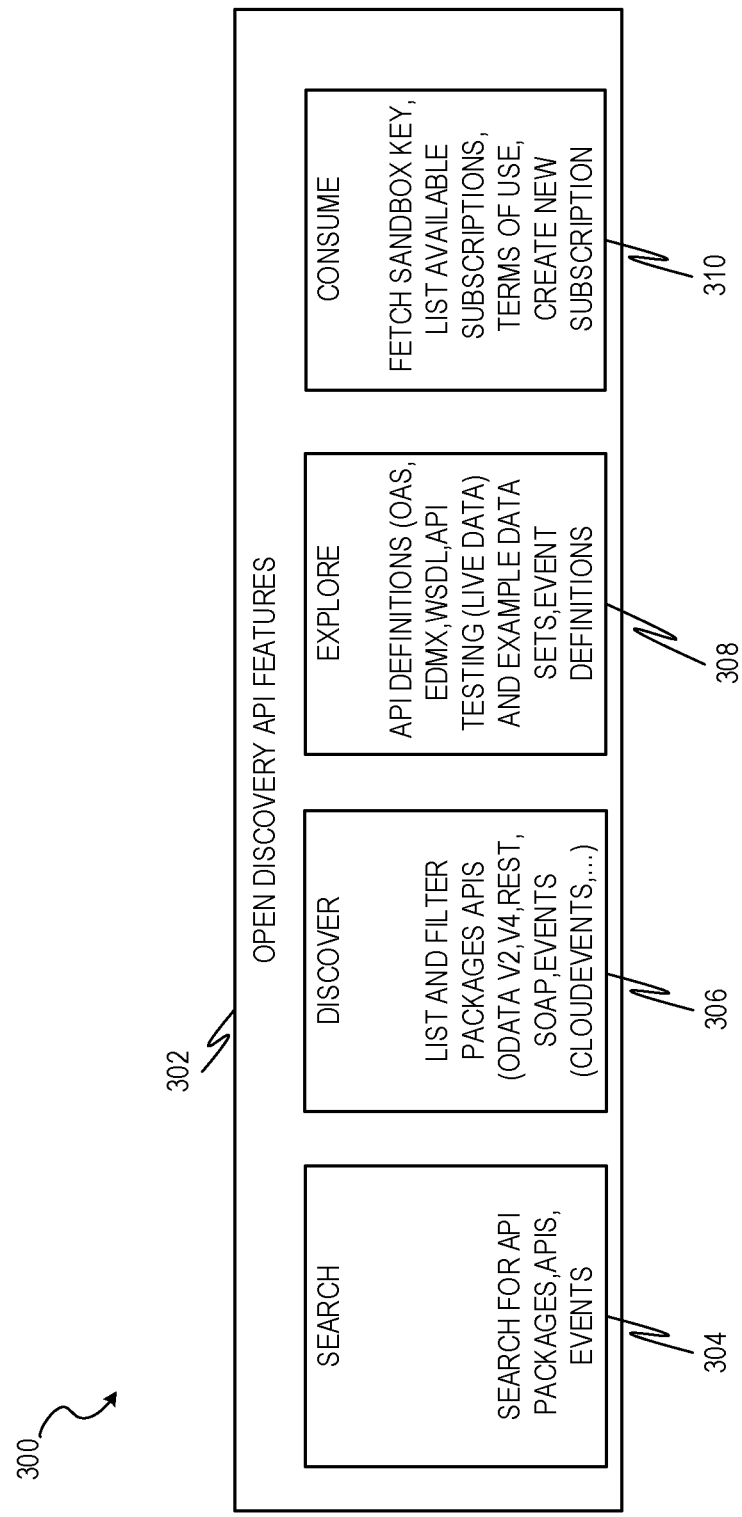
FIG. 3 is a block diagram showing examples of open discovery API features, in accordance with an example embodiment.

FIG. 3 is a block diagram showing examples of open discovery API features 302, in accordance with an example embodiment. The open discovery API features 302 can allow users (or other API consumers) to search for, select, and implement APIs that are available form API providers. For example, the open discovery API features 302 can implement the developer and UI functions. A search feature 304, for example, can allow users to search for API packages, APIs, and events, such as by name or type. A discover feature 306, for example, can allow a user to list and filter packages, APIs, and events (for example, cloud events) in various ways. An explore feature 308, for example, can allow a user to find API definitions (for example, Open API Standard (OAS), Entity Data Model Designer (EDMD) for edmx files, Web Services Description Language (WSDL), API testing and example data sets, and even definitions (for example AsyncAPI). The explore feature 308 can make use of information from packages that group APIs by various features. The explore feature 308 can allow users to search for APIs using keywords, filter results, and drill down to specific information for a given API. A consume feature 310, for example, can allow a user to fetch sandbox keys, list available subscriptions and terms of use, and create new subscriptions.

Figure 4:
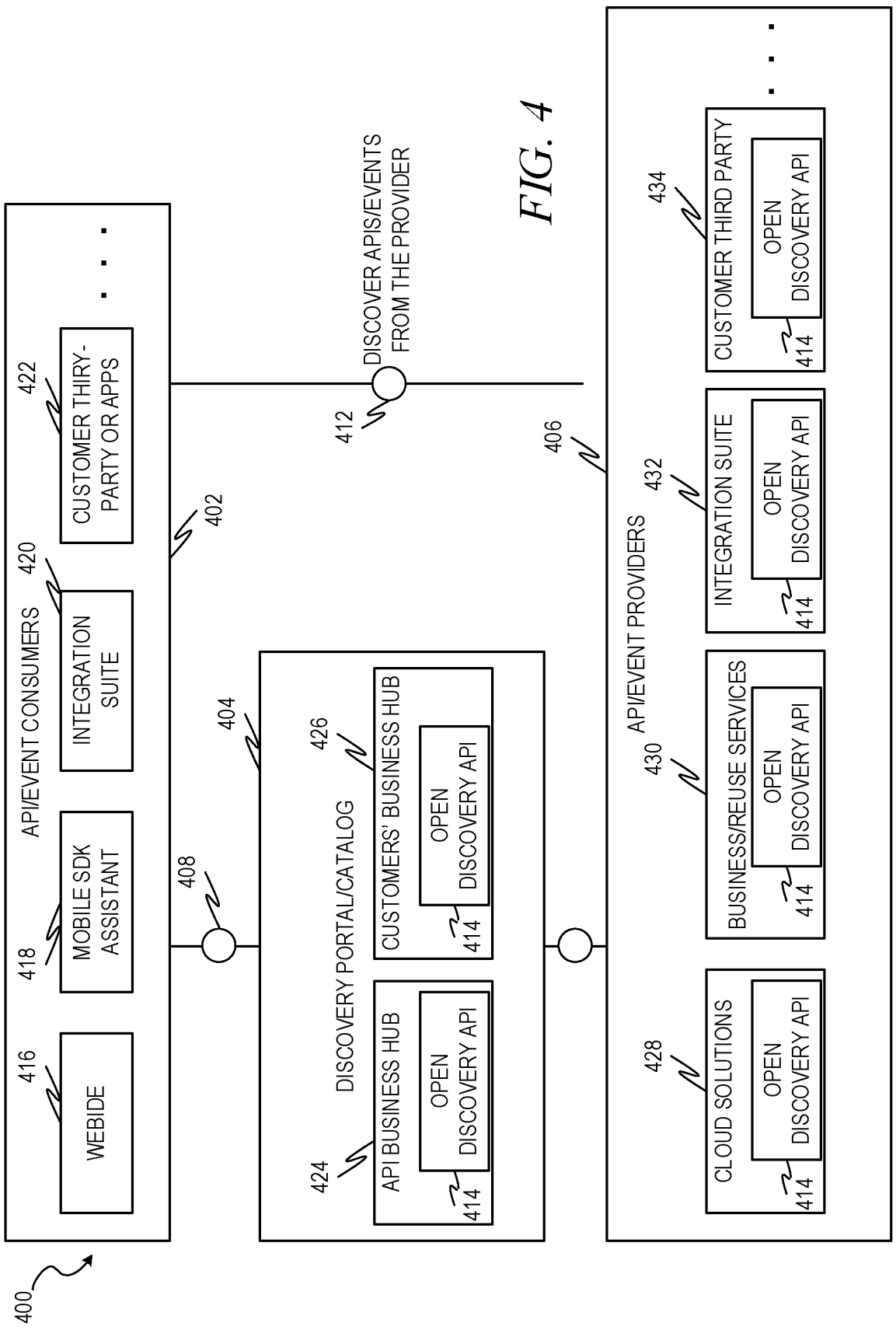
FIG. 4 is a block diagram showing an example of an architecture for open discovery API use, in accordance with an example embodiment.

FIG. 4 is a block diagram showing an example of an architecture 400 for open discovery API use, in accordance with an example embodiment. The architecture 400 can support API discovery and use in the cloud, for example, or in non-cloud networks. The architecture 400 can provide an open discoverable format used by API consumers to discover and use different kinds of APIs. Discovery can occur using the open discoverable format (for example, through a central repository), and subsequent use of the APIs can occur using the formats and communication protocols that are provided by the architecture 400. For example, the APIs of the different API providers can be exposed (for example, in a UI) in a common format that is easily digested by the user. Selection of an API by the user can cause an automatic import of the API-specific or API-proprietary format into the user's current context. For example, importing the API-specific or API-proprietary format can cause an addition to the user's application code, where the addition is a call to the API with the corresponding input and output parameters coded in the API-specific or API-proprietary format. Further, the security mechanisms that are needed to connect to the API can automatically be completed in the user's code. Security mechanisms can include, for example, API meta information such as security definitions and external links. In this way, the open API format aspects of the architecture 400 can initially serve as a bridge for the user, after which connections occur directly to the APIs of the API providers. After an initial handshake is accomplished using the connections, for example, the open API format can be skipped.

The architecture 400 includes API/event consumers 402 that can use a discovery portal/catalog 404 for access to API/event providers 406. Discovery 408 by the API/event consumers 402 that uses the discovery portal/catalog 404 can include, for example, discovery of APIs and events published by system or by customers. The discovery also relies on published APIs and events published by the API/event providers 406. After discovery, API/event consumers 402 can access the API/event providers 406 directly. Discovery by the API/event consumers 402 can also include direct discovery 412 using APIs and events published by the API/event providers 406. Components of the API/event consumers 402, the discovery portal/catalog 404, and the API/event providers 406 include open discovery API 414 components that provide the open API capabilities.

The API/event consumers 402 can include, for example, WebIDE tools 416, mobile SDK assistant tools 418, integration suite tools 420, customer third-party tools or applications 422. The discovery portal/catalog 404 can include, for example, an API business hub 424 and customers' business hubs 426. The API/event providers 406 can include, for example, cloud solutions, 428, business re-use services 430, integration suites 432, and customer/third-party APIs and events 434.

Packages can be used to group APIs by tag, for example, by API type. Tags can include, for example, product, line of business, industry, and country.

One technical issue that arises with such implementations is that it can be difficult for applications, such as those operated by API/event consumers 402, to implement, because it mandated that a complicated API interface be used, which places a lot of implementation effort on the applications themselves. In an example embodiment, this technical issue is solved by decomposing resource discovery roles, parts, and transport modes into more individualized entities that allow for resource information sharing without complicated API interfaces to be implemented by the applications. More particularly the information that needs to be defined is decoupled from how this information is transported.

In an example embodiment, three roles are defined for resource discovery: provider, aggregator, and consumer. The provider is the one whose resource information will be shared. Rather than the provider needing to implement the complicated API, however, an aggregator may provide that role. The ORD specification defines and standardizes the API for providers. Based on this API, the aggregator is able to gather resource information from potentially multiple providers (and also, in some embodiments, other aggregators). The consumer then accesses the aggregator to obtain resource information rather than directly accessing the provider.

This new architecture also permits consumer interfaces to be added and changed without having an impact on the provider-side.

Figure 5:
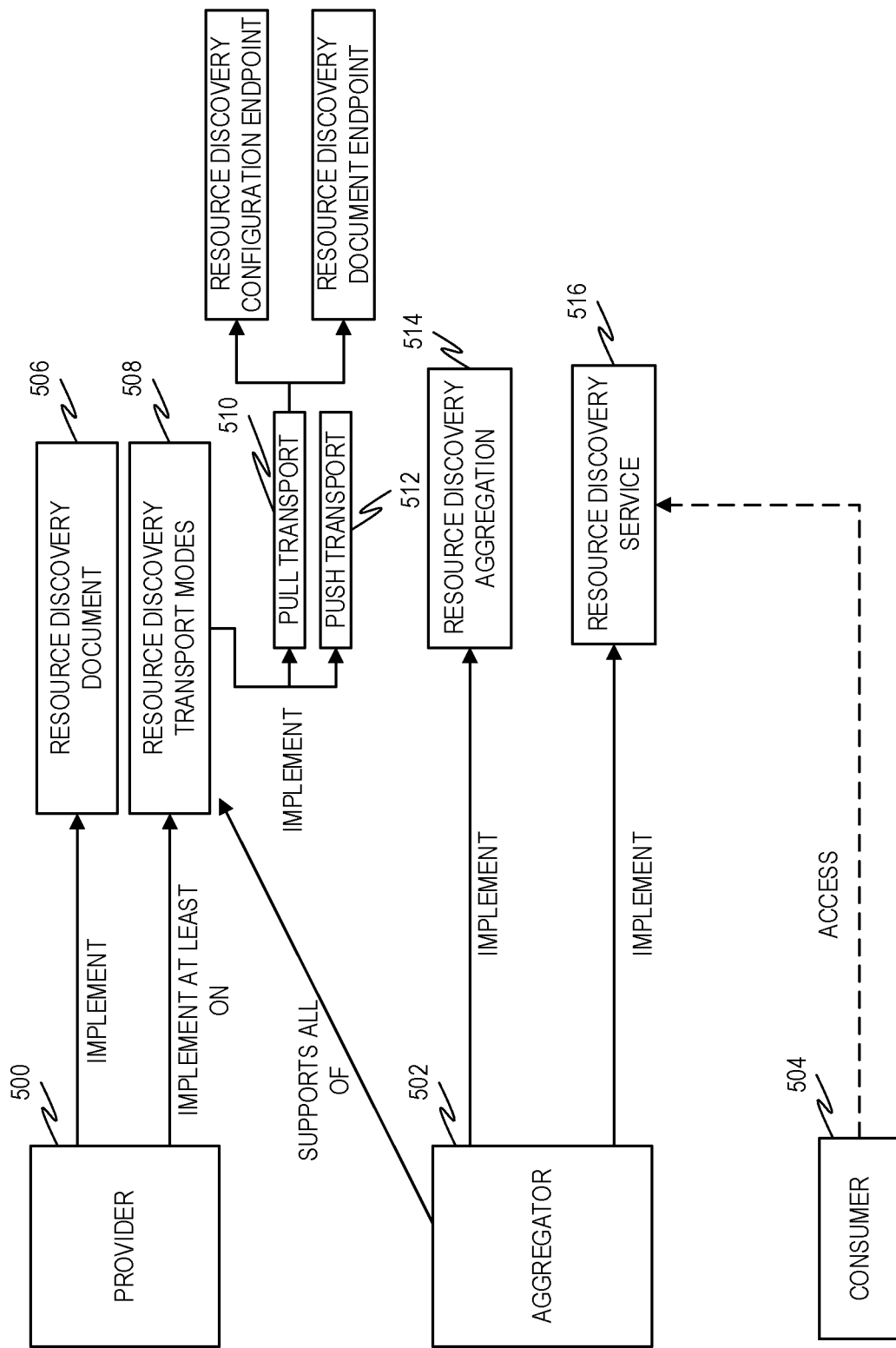
FIG. 5 is a block diagram illustrating the relationships between resource discovery roles and parts, in accordance with an example embodiment.

FIG. 5 is a block diagram illustrating the relationships between resource discovery roles and parts, in accordance with an example embodiment. Here, as described above, the three roles are provider 500, aggregator 502, and consumer 504. The parts include the resource discovery document 506, resource discovery transport modes 508 (which includes both pull transport 510 and push transport 512), resource discovery aggregation 514 (which includes rules and validation), and resource discovery service 516. The provider 500 implements the resource discovery document 506 and at least one of the transport modes 508. The aggregator supports all the transport modes 508 and implements the resource discovery aggregation 514 and resource discovery service 516. The consumer 504 then accesses the resource discovery service 516. Notably, the provider 500 does not need to implement either the resource discovery aggregation 514 or resource discovery service 516, simplifying the implementation greatly for the provider 500.

The provider 500 provides a high-level, combined view of the exposed resources (e.g., APIs, events) in the described system instance. This may be implemented by using a configuration, located at a uniform resource identifier (URI), along with one or more resource discovery document 506. This makes the metadata of the provider's 500 system crawlable and navigable. The provider 500 defines a standardized endpoint with a location that is known to aggregators 502. A definition file is then stored at this standardized endpoint. In an example embodiment, the definition file is a JavaScript Object Notation (JSON) file.

More particularly, each resource discovery document may contribute information about the machine-readable system landscape metadata view, which indicates, for example, how a consumer finds out which APIs are available for integration, which APIs are available, whether the APIs are customizable (or have been customized already), and if so, how they look for each specific tenant. This information is provided at runtime, potentially reflecting tenant-specific customizations to the APIs.

The aggregator 502 collects, aggregates, and proxies the resource discovery information from potentially multiple providers 500 and other aggregators 502. This may be performed within the context of tenants, zones, and accounts. The aggregator 502 reflects the combined information of many system instances, which allows a system landscape view. The aggregator exposes the information through a high-quality API called the resource discovery service 516, which enriches the response with information from other sources.

The consumer 504 discovers the exposed resources of a given system or a combined system landscape; it obtains machine-readable metadata.

The pull transport 510 defines how the aggregator 502 requests resource discovery information from provider 500, while the push transport 512 defines how the provider 500 can push the resource discovery information to the aggregator(s) 502 without formal request, such as by a subscription service. Other possible transports may include event-driven transports.

Figure 6:
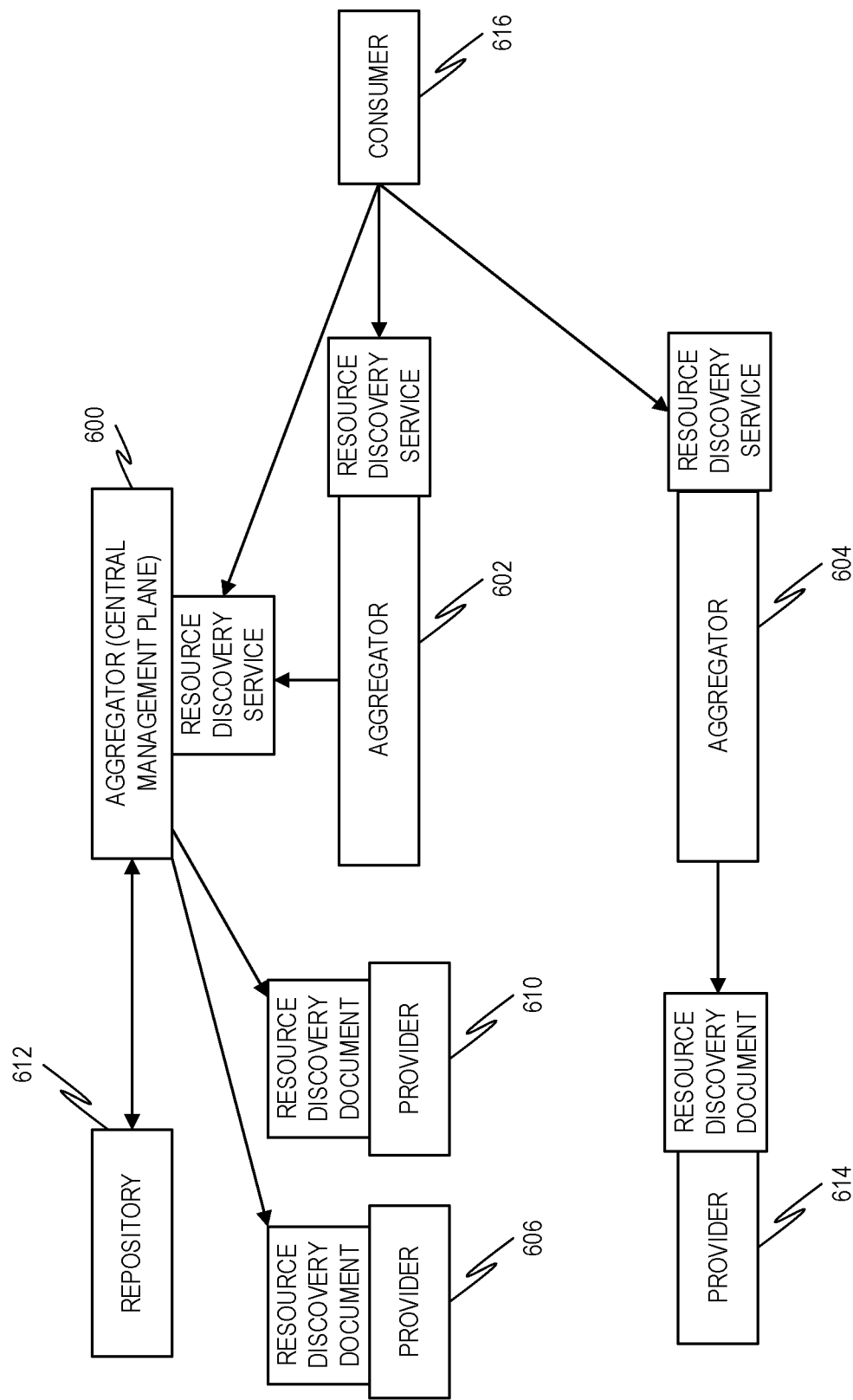
FIG. 6 is a block diagram illustrating a system for resource discovery, in accordance with an example embodiment.

FIG. 6 is a block diagram illustrating a system for resource discovery in accordance with an example embodiment. Here, there are three aggregators: 600, 602, 604. Aggregator 600 may be a central management plane, which means it not only obtains resource information from providers 606 and 610, but also discovers the system instances related to providers 606 and 610 from repository 612. Aggregator 602 may obtain resource discovery information from aggregator 600. Therefore, in one sense, aggregator 600 is not just an aggregator but also a provider with a higher quality interface. Aggregator 604 separately obtains resource discovery information from provider 614. Consumer 616 can then request resource discovery information from services implemented by aggregators 600, 602, and 604.

Figure 7:
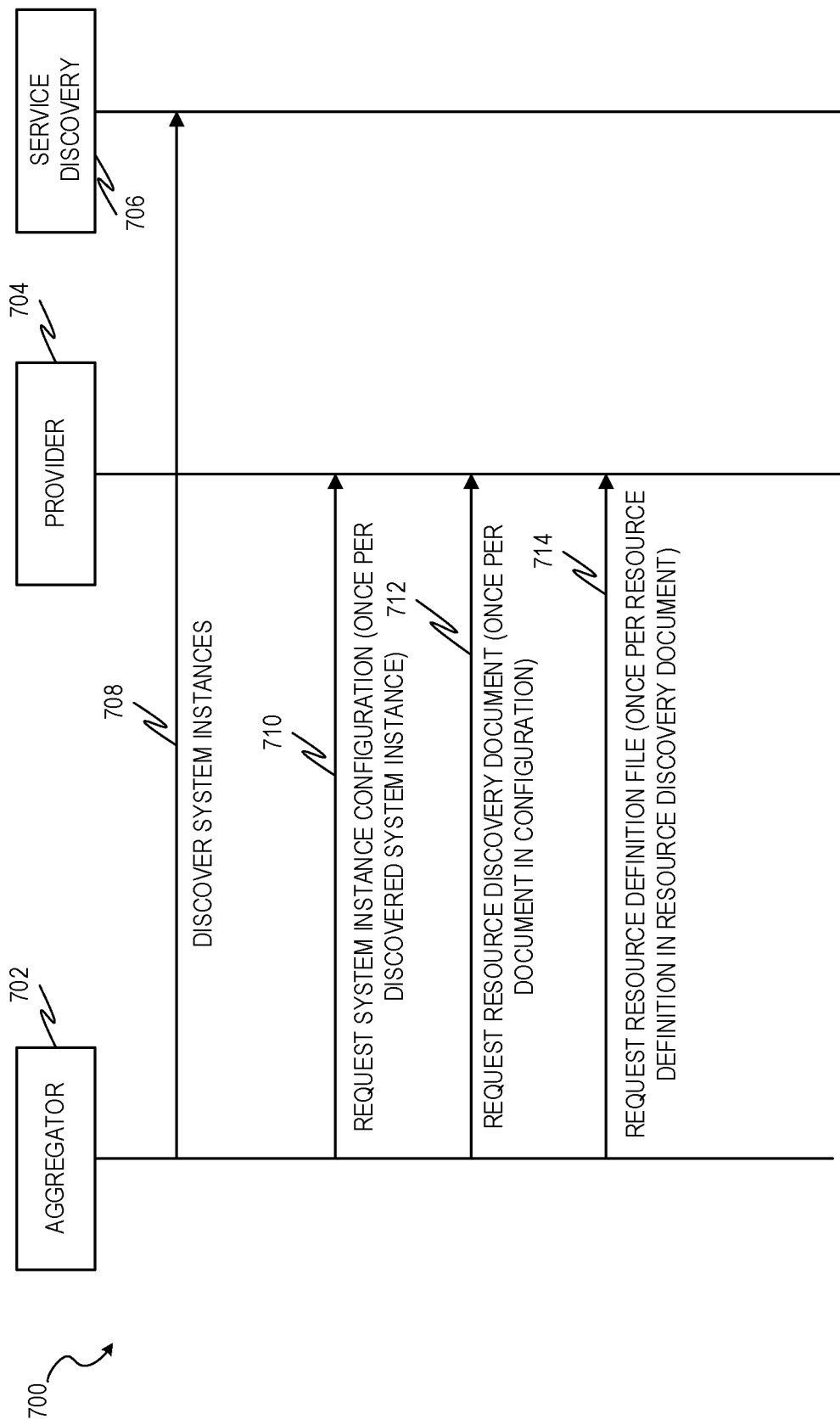
FIG. 7 is a ladder diagram illustrating a method for performing 2-phase discovery.

FIG. 7 is a ladder diagram illustrating a method 700 for performing 2-phase discovery. The method 700 involves an aggregator 702, a provider 704, and a repository 706. At operation 708, the aggregator 702 discovers system instances from the repository 706. A loop is then begun for each discovered system instance. At operation 710, the aggregator 702 requests system instance configuration from the provider 704. This process is repeated for each provider corresponding to a discovered system instance.

Then, for each resource discovery document in each system instance configuration, at operation 712, the aggregator 702 requests the resource discovery document from the corresponding provider 704, using an access strategy. An access strategy may be customized to allow for information that may be customized or protected. The access strategy designates how the aggregator 702 needs to access this information (e.g., security, identification of the tenant whose information is attempting to be retrieved). Then, for each resource definition in each resource discovery document, the corresponding resource definition file is requested from the corresponding provider 704 at operation 714. The following is an example of a configuration file, in accordance with an example embodiment:

```
"documents": [
    {
        "url": "/open-resource-discovery/v1/documents/1",
        "accessStrategies": [
            {
                "type": "open"
            }
        ]
    },
    {
        "url": "/open-resource-discovery/v1/documents/2",
        "accessStrategies": [
            {
                "type": "custom",
                "customType": "sap.foo.bar:open-global-tenant-id:v1",
                "customDescription": "The metadata information is openly
                    accessible but system instance aware.\nThe tenant is selected
                    by providing a SAP global tenant ID header. "
            },
            {
                "type": "custom",
                "customType": "sap.foo.bar:open-local-tenant-id:v1",
                "customDescription": "The metadata information is openly
                    accessible but system instance aware. \nThe tenant is
                    selected by providing a local tenant ID header. [...]"
            },
            {
                "type": "open"
            }
        ],
        "systemInstanceAware": true
    }
]
```

When a provider is added to the system, the aggregator 702 may provide a list of the access strategies that work for them, and the provider can then select one of these access strategies from the list. The following pseudocode describes an example of the list of access strategies, in accordance with an example embodiment.

An access strategy defines a contract indicating how an aggregator can retrieve the content from the provider. The content may be protected or openly accessible and can be system instance-aware or not.

In an example embodiment, the aggregator implements a simplified API by exposing a well-known configuration. The term "well-known" in this context refers to the fact that the configuration location or other access parameters are available publicly. Then, the provider exposes the resource discovery documents themselves. Finally, referenced metadata, such as resource definitions, are exposed by the provider.

More particularly, a standardized single point of entry for the metadata discovery at the provider is introduced by using a well-known Uniform Resource Identifier (URI), which can then be registered in a Well-known URI registry. The endpoint has a fixed relative Uniform Resource Locator (URL) (e.g., "/.well-known/open-resource-discovery"), which is appended to the base URL of the system. When a GET request against this URL is executed and the system has implemented resource discovery as a provider, it will return a resource discovery configuration. The resource discovery configuration will indicate which resource discovery versions and capabilities are supported. Further, it will also indicate where and how the resource discovery information can be found. For pull-based transport, this indicates the URLs of all the resource discovery documents that carry the information. Additionally, it describes multiple access strategies regarding how the information can be accessed. The access strategies can either be known and standardized through resource discovery standards directly or through custom access strategies that can be described and agreed upon through their IDs.

When the provider and the aggregator share at least one supported access strategy, then the request for resource discovery information can be successfully made.

Allowing both the provider and the aggregator to support multiple access strategies at the same time not only adds flexibility but also a migration path to introduce new access strategies that can replace deprecated approaches over time (with grace periods where old and new approaches are supported out of time).

The access strategies may be defined using an access strategy type field, a custom type field (if needed), and a custom description field (also if needed). The types may include "open" (indicating that the resource discovery documents are openly accessible and not protected via authentication) and "custom", which can be used for various types of protected resource discovery documents.

Resource discovery components at each provider provide resource discovery information to requesting entities/processes, in this case aggregators. Resource discovery information can have different scopes of views. System instance aware information describes the state of a specific system instance at run-time, potentially reflecting customizations. System instance aware information may differ between system instances, depending on the tenant specific customizability of them. System instance unaware information, on the other hand, are identical across all system instances of the described system type. Cross-system information is shared between multiple system types. Most notably, this applies to a resource discovery taxonomy.

Resource discovery information can also be categorized into resources and taxonomies. Resource discovery resource information describes application and service resources, such as API resources and event resources. It may also be system instance aware, depending on the implementation of the system type.

The resource discovery taxonomy is used to categorize and structure resources. Taxonomies span across products and system types, and thus may be considered cross-system information. Some taxonomies may be implemented as dedicated entities that can express additional information, while other taxonomies are provided via fixed enums (code lists) and are defined as part of resource discovery itself, such as tags.

Resource discovery behavior standardizes how resource discovery information is discovered, transported, and aggregated.

A system type is an abstract type of an application or service. A system installation is a concrete running instance of a system type. If the system type supports tenant isolation, a system installation may offer multiple system instances.

A resource is provided by or for a system instance for outside consumption and/or communication. As such, the resource discovery components may be considered resources in this context, although under some circumstances, they may be considered system instances or installations.

As mentioned above, there are multiple ways the resource discovery components can communicate with aggregators. One way is a pull transport mode. Here, resource discovery information is made available through a Representational State Transfer (REST) API that exposes resource discovery documents via endpoints. This has the benefit of a decentralized approach, but periodic polling can reduce operational efficiency, slowing information updates. Another potential approach is a push transport, where the document is pushed to a requester via a webhook, a Hypertext Transfer Protocol (HTTP) POST endpoint, or a file upload. Another potential approach is an import transport, where a resource discovery document is stored as a JavaScript™ Object Notation (JSON) file. Another potential approach is event-driven transport, which uses a publish/subscribe or distributed log pattern.

Figure 8:
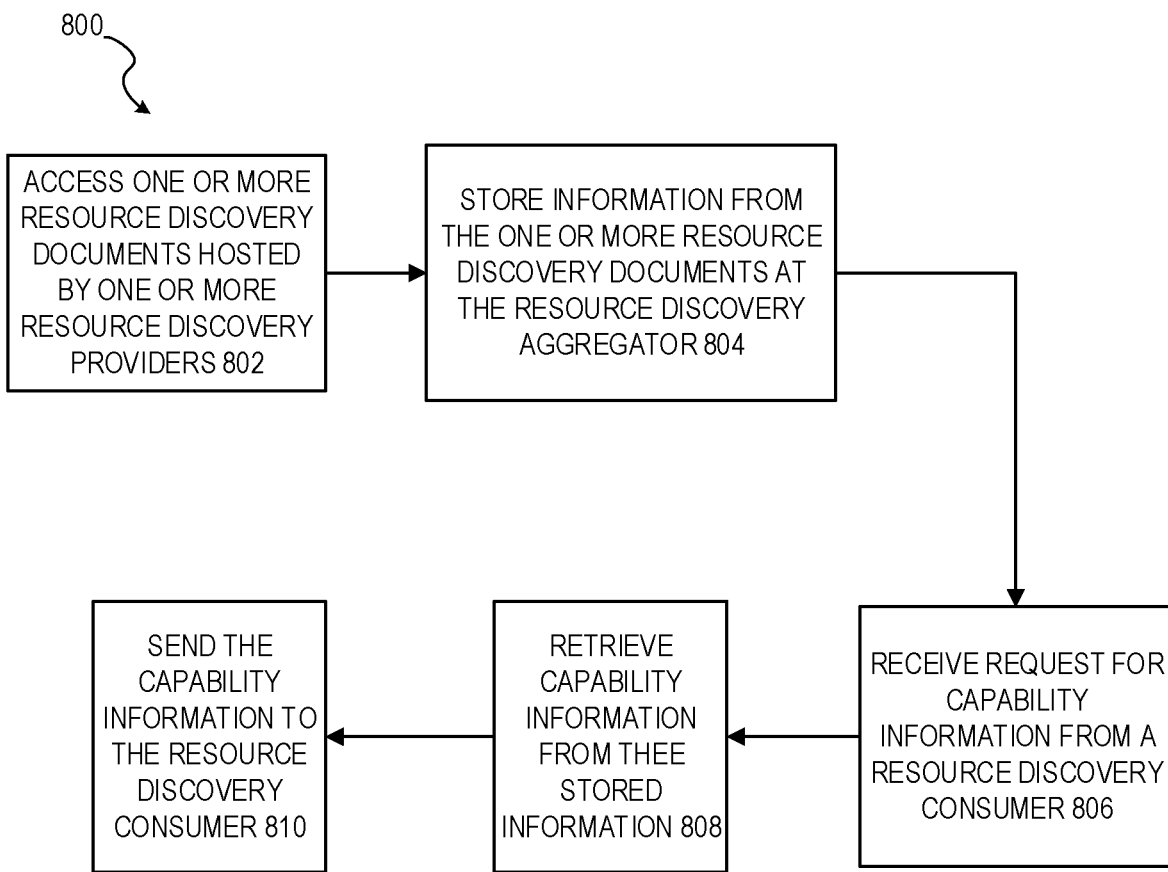
FIG. 8 is flow diagram illustrating a method for resource discovery in a computer system, in accordance with an example embodiment.

FIG. 8 is flow diagram illustrating a method 800 for resource discovery in a computer system, in accordance with an example embodiment. The method 800 may be performed by a resource discovery aggregator. At operation 802, one or more resource discovery documents hosted by one or more resource discovery providers are accessed. Each of the one or more resource discovery providers exposes a configuration file at a location known to the resource discovery aggregator, which the resource discovery aggregator uses to access the one or more resource discovery documents. Each resource discovery document indicates one or more capabilities of the corresponding resource discovery provider.

At operation 804, information from the one or more resource discovery documents is stored at the resource discovery aggregator. At operation 806, a request for capability information is received from a resource discovery consumer. At operation 808, in response to the receiving, the capability information is retrieved from the stored information. At operation 810, the capability information is sent to the resource discovery consumer.

Figure 9:
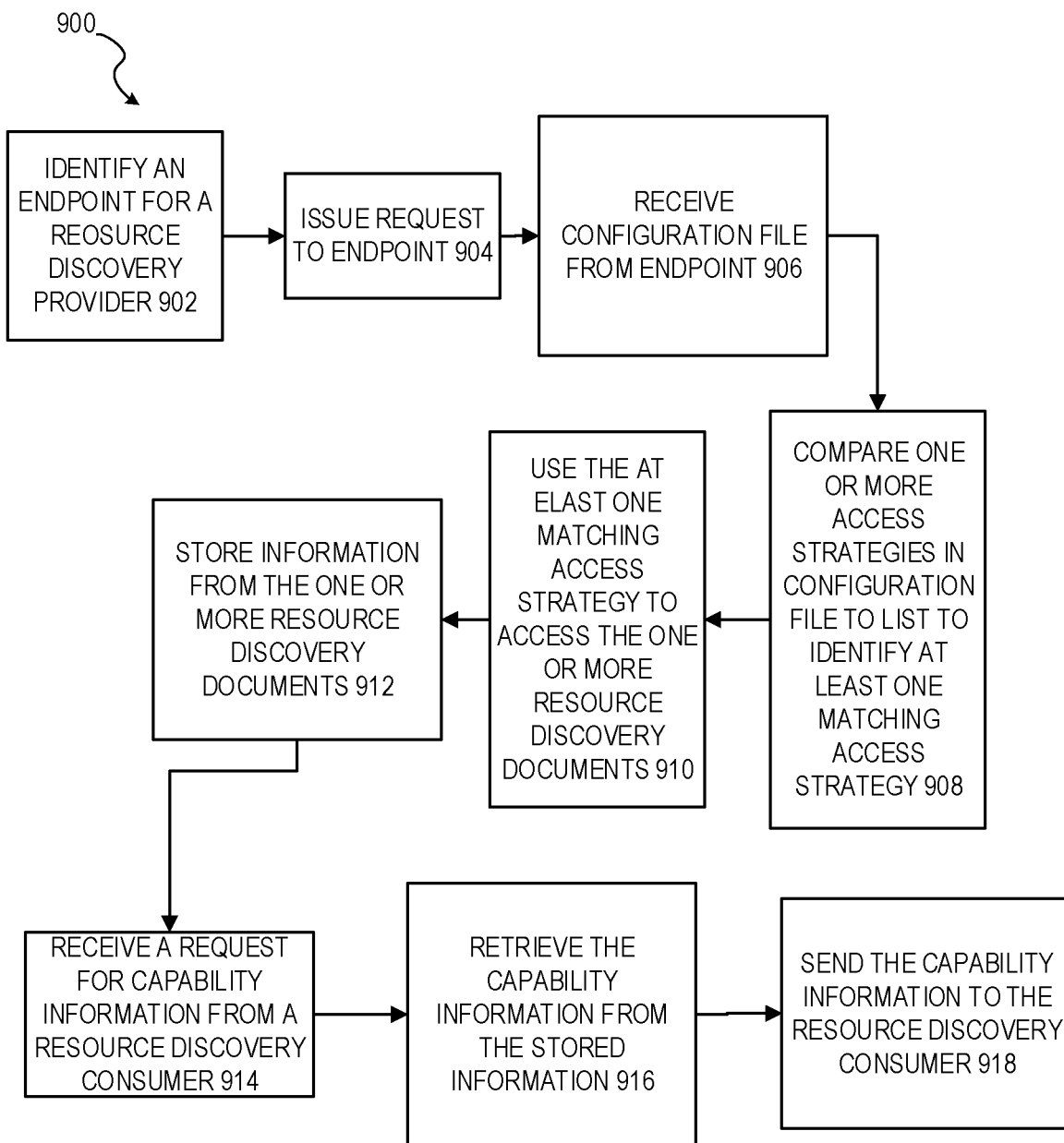
FIG. 9 is a flow diagram illustrating a method for access resource discovery documents, in accordance with an example embodiment.

FIG. 9 is a flow diagram illustrating a method 900 for access resource discovery documents, in accordance with an example embodiment. The method 900 may be performed at a resource discovery aggregator. At operation 902, an endpoint for a resource discovery provider is identified. This may be performed by accessing a well-known URI registry to identify a registered URI for the endpoint. At operation 904, a request to the endpoint is issued. This may be an HTTP GET command. At operation 906, in response to the issuing of the request, a configuration file is received from the endpoint. The configuration file indicates one or more locations of one or more resource discovery documents and one or more access strategies that can be used to access the one or more resource discovery documents, each resource discovery document indicating one or more capabilities of the resource discovery provider.

At operation 908, the one or more access strategies are compared to a list of one or more access strategies supported by the resource discovery aggregator to identify at least one matching access strategy present in both the one or more access strategies in the configuration file and the list. At operation 910, the at least one matching access strategy is used to access the one or more resource discovery documents. At operation 912, information from the one or more resource discovery documents are stored. At operation 914, a request for capability information is received from a resource discovery consumer. At operation 916, in response to the receiving, the capability information is retrieved from the stored information. Finally, at operation 918, the capability information is sent to the resource discovery consumer.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
at least one hardware processor; and
a computer-readable medium storing instructions that, when executed by the at least one hardware processor, cause the at least one hardware processor to perform operations comprising:
accessing, at a resource discovery aggregator, one or more resource discovery documents hosted by one or more resource discovery providers, each of the one or more resource discovery providers exposing a configuration file at a location known to the resource discovery aggregator, which the resource discovery aggregator uses to access the one or more resource discovery documents, each resource discovery document indicating one or more capabilities of the corresponding resource discovery provider;
storing, at the resource discovery aggregator, information from the one or more resource discovery documents;
receiving, from a resource discovery consumer, a request for capability information;
in response to the receiving, retrieving the capability information from the stored information; and
sending the capability information to the resource discovery consumer.

Example 2. The system of Example 1, wherein the one or more capabilities includes metadata indicating application program interface capabilities of the corresponding resource discovery provider.

Example 3. The system of Example 2, wherein the application program interface capabilities include one or more tenant-specific customizations of application program interfaces of the corresponding resource discovery provider.

Example 4. The system of any of Examples 1-3, wherein at least one of the resource discovery providers is also a resource discovery aggregator.

Example 5. The system of any of Examples 1-4, wherein the configuration file additionally indicates one or more transport modes supported by the corresponding resource discovery aggregator.

Example 6. The system of Example 5, wherein the one or more transport modes includes a pull transport mode.

Example 7. The system of Example 5, wherein the one or more transport modes includes a push transport mode.

Example 8. A method comprising:

accessing, at a resource discovery aggregator, one or more resource discovery documents hosted by one or more resource discovery providers, each of the one or more resource discovery providers exposing a configuration file at a location known to the resource discovery aggregator, which the resource discovery aggregator uses to access the one or more resource discovery documents, each resource discovery document indicating one or more capabilities of the corresponding resource discovery provider;

storing, at the resource discovery aggregator, information from the one or more resource discovery documents;

receiving, from a resource discovery consumer, a request for capability information;

in response to the receiving, retrieving the capability information from the stored information; and sending the capability information to the resource discovery consumer.

Example 9. The method of Example 8, wherein the one or more capabilities includes metadata indicating application program interface capabilities of the corresponding resource discovery provider.

Example 10. The method of Example 9, wherein the application program interface capabilities includes one or more tenant-specific customizations of application program interfaces of the corresponding resource discovery provider.

Example 11. The method of any of Examples 8-10, wherein at least one of the resource discovery providers is also a resource discovery aggregator.

Example 12. The method of any of Examples 8-11, wherein the configuration file additionally indicates one or more transport modes supported by the corresponding resource discovery aggregator.

Example 13. The method of Example 12, wherein the one or more transport modes includes a pull transport mode.

Example 14. The method of Example 12, wherein the one or more transport modes includes a push transport mode.

Example 15. A non-transitory machine-readable medium storing instructions which, when executed by one or more processors, cause the one or more processors to perform operations comprising:

accessing, at a resource discovery aggregator, one or more resource discovery documents hosted by one or more resource discovery providers, each of the one or more resource discovery providers exposing a configuration file at a location known to the resource discovery aggregator, which the resource discovery aggregator uses to access the one or more resource discovery documents, each resource discovery document indicating one or more capabilities of the corresponding resource discovery provider;

storing, at the resource discovery aggregator, information from the one or more resource discovery documents;

receiving, from a resource discovery consumer, a request for capability information;

in response to the receiving, retrieving the capability information from the stored information; and sending the capability information to the resource discovery consumer.

Example 16. The non-transitory machine-readable medium of Example 15, wherein the one or more capabilities includes metadata indicating application program interface capabilities of the corresponding resource discovery provider.

Example 17. The non-transitory machine-readable medium of Example 16, wherein the application program interface capabilities includes one or more tenant-specific customizations of application program interfaces of the corresponding resource discovery provider.

Example 18. The non-transitory machine-readable medium of any of Examples 15-17, wherein at least one of the resource discovery providers is also a resource discovery aggregator.

Example 19. The non-transitory machine-readable medium of any of Examples 15-18, wherein the configuration file additionally indicates one or more transport modes supported by the corresponding resource discovery aggregator.

Example 20. The non-transitory machine-readable medium of Example 19, wherein the one or more transport modes includes a pull transport mode.

Figure 10:
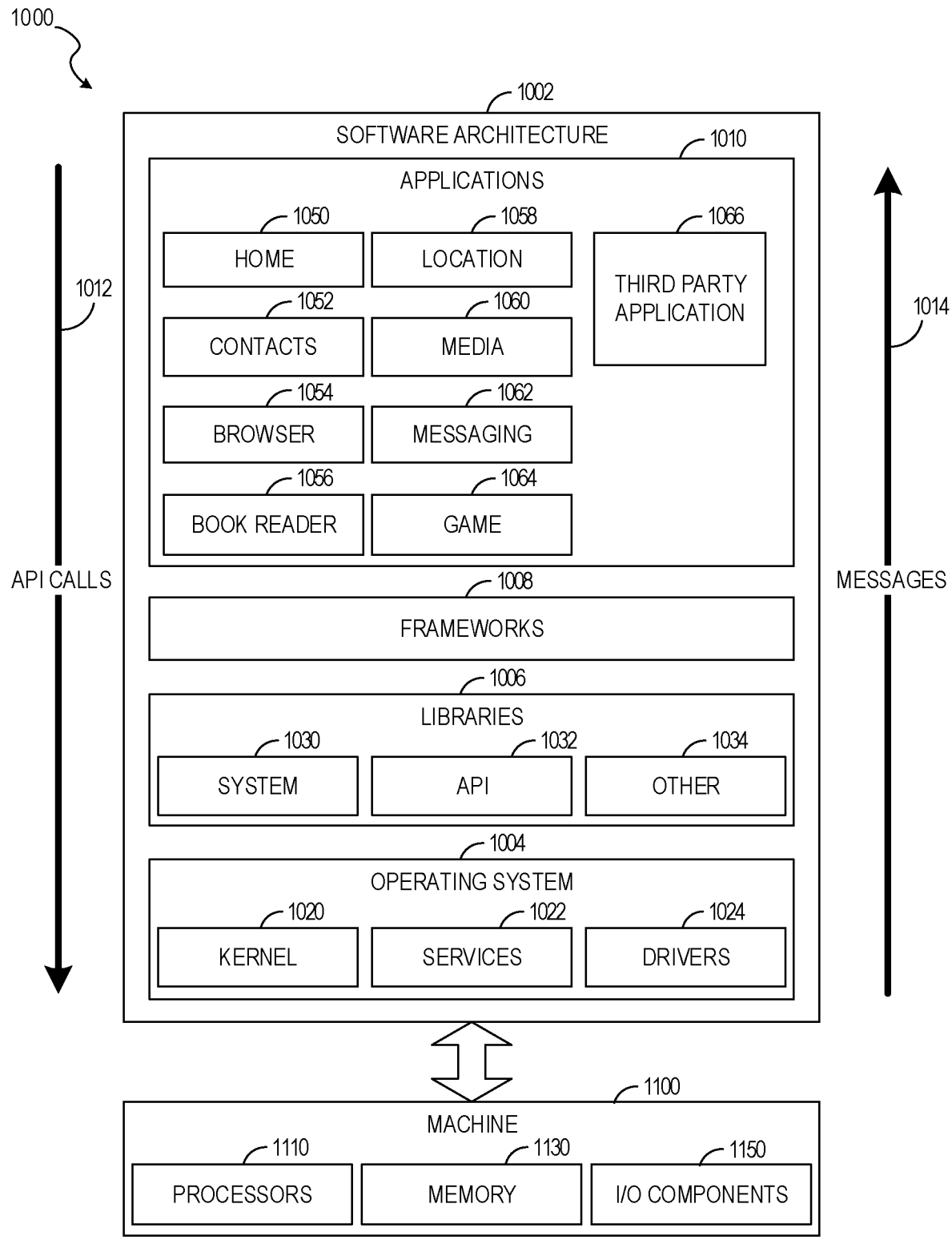
FIG. 10 is a block diagram illustrating a software architecture, which can be installed on any one or more of the devices described above.

FIG. 10 is a block diagram 1000 illustrating a software architecture 1002, which can be installed on any one or more of the devices described above. FIG. 10 is merely a non-limiting example of a software architecture, and it will be appreciated that many other architectures can be implemented to facilitate the functionality described herein. In various embodiments, the software architecture 1002 is implemented by hardware such as a machine 1100 of FIG. 11 that includes processors 1110, memory 1130, and input/output (I/O) components 1150. In this example architecture, the software architecture 1002 of FIG. 10 can be conceptualized as a stack of layers where each layer may provide a particular functionality. For example, the software architecture 1002 includes layers such as an operating system 1004, libraries 1006, frameworks 1008, and applications 1010. Operationally, the applications 1010 invoke Application Program Interface (API) calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionalities. The services 1022 can provide other common services for the other software layers. The drivers 1024 are responsible for controlling or interfacing with the underlying hardware. For instance, the drivers 1024 can include display drivers, camera drivers, BLU- ETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010. For example, the frameworks 1008 provide various graphical user interface (GUI) functions, high-level resource management, high-level location services, and so forth. The frameworks 1008 can provide a broad spectrum of other APIs that can be utilized by the applications 1010, some of which may be specific to a particular operating system 1004 or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications, such as a third-party application 1066. The applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 1066 can invoke the API calls 1012 provided by the operating system 1004 to facilitate functionality described herein.

Figure 11:
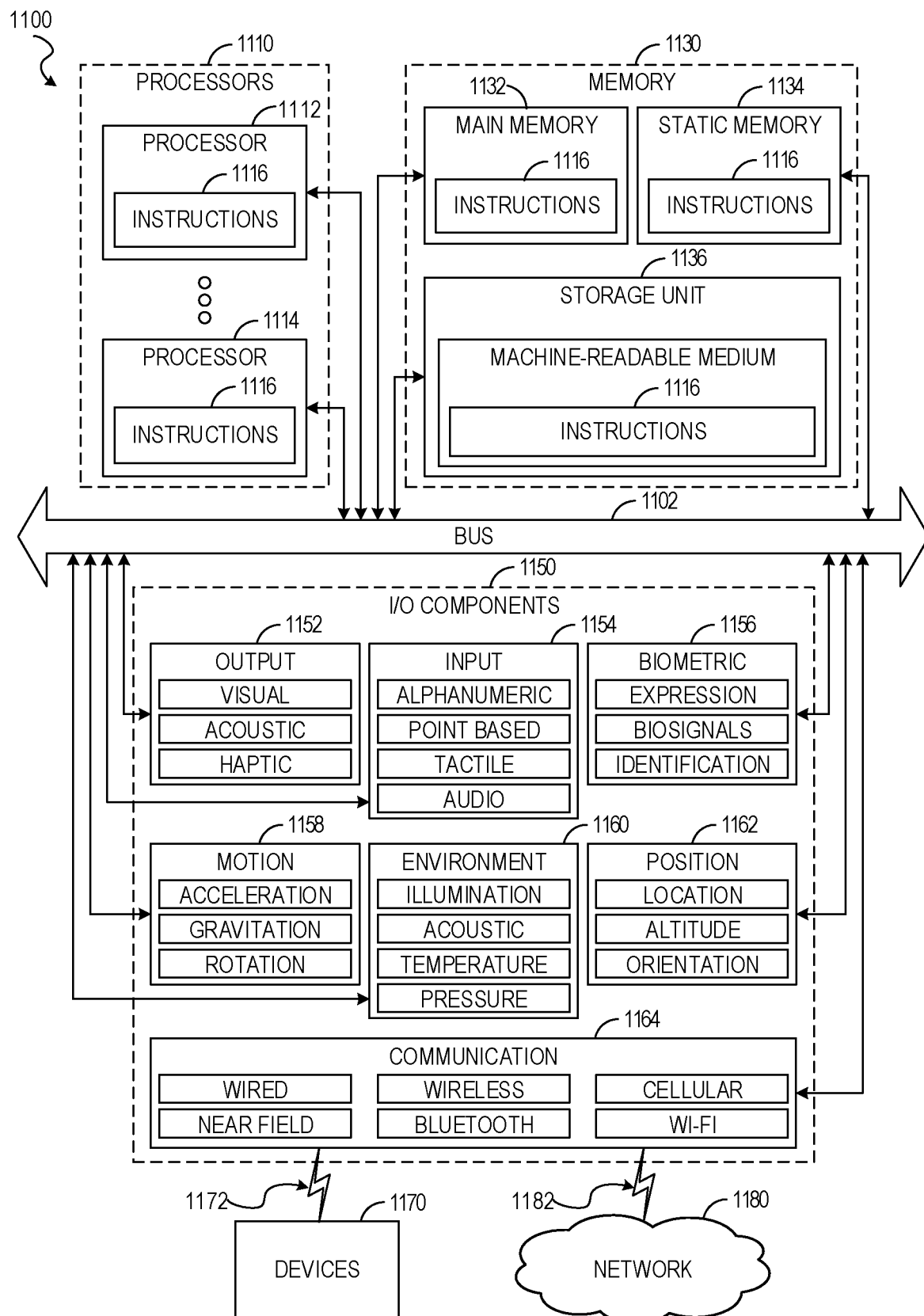
FIG. 11 illustrates a diagrammatic representation of a machine in the form of a computer system within which a set of instructions may be executed for causing the machine to perform any one or more of the methodologies discussed herein.

FIG. 11 illustrates a diagrammatic representation of a machine 1100 in the form of a computer system within which a set of instructions may be executed for causing the machine 1100 to perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute the methods of FIGS. 8-9. Additionally, or alternatively, the instructions 1116 may implement FIGS. 1-9 and so forth. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors that may comprise two or more independent processors (sometimes referred to as "cores") that may execute instructions 1116 contemporaneously. Although FIG. 11 shows multiple processors 1110, the machine 1100 may include a single processor 1112 with a single core, a single processor 1112 with multiple cores (e.g., a multi-core processor 1112), multiple processors 1112, 1114 with a single core, multiple processors 1112, 1114 with multiple cores, or any combination thereof.

The memory 1130 may include a main memory 1132, a static memory 1134, and a storage unit 1136, each accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion, and the grouping is in no way limiting. In various example embodiments, the I/O components 1150 may include output components 1152 and input components 1154. The output components 1152 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1162 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., coupled via a USB).

Moreover, the communication components 1164 may detect identifiers or include components operable to detect identifiers. For example, the communication components 1164 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

The various memories (i.e., 1130, 1132, 1134, and/or memory of the processor(s) 1110) and/or the storage unit 1136 may store one or more sets of instructions 1116 and data structures (e.g., software) embodying or utilized by any one or more of the methodologies or functions described herein. These instructions (e.g., the instructions 1116), when executed by the processor(s) 1110, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1180 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of several well-known transfer protocols (e.g., Hypertext Transfer Protocol (HTTP)). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   accessing, at a resource discovery aggregator, one or more resource discovery documents hosted by one or more resource discovery providers, each of the one or more resource discovery providers exposing a configuration file at a configuration file location known to the resource discovery aggregator, the configuration file containing a resource discovery document location, one or more transport modes, comprising a pull transport mode, supported by the corresponding resource discovery aggregator, and a plurality of access strategies for each of at least one of the one or more resource discovery documents, each access strategy including security information to be used when accessing a corresponding resource discovery document, the resource discovery aggregator using the configuration file location to access the one or more resource discovery documents at one or more document locations different than the configuration file location, each resource discovery document indicating one or more capabilities of the corresponding resource discovery provider, the resource discovery aggregator being a different entity than the one or more resource discovery providers;
   the configuration file location including a uniform resource identifier (URI);
   storing, at the resource discovery aggregator, information from the one or more resource discovery documents;
   receiving, from a resource discovery consumer, a request for capability information;
   in response to the receiving, retrieving the capability information from the stored information; and
   sending the capability information to the resource discovery consumer.

2. The system of claim 1, wherein the one or more capabilities includes metadata indicating application program interface capabilities of the corresponding resource discovery provider.

3. The system of claim 2, wherein the application program interface capabilities include one or more tenant-specific customizations of application program interfaces of the corresponding resource discovery provider.

4. The system of claim 1, wherein at least one of the resource discovery providers is also a resource discovery aggregator.

5. A method comprising:
   accessing, at a resource discovery aggregator, one or more resource discovery documents hosted by one or more resource discovery providers, each of the one or more resource discovery providers exposing a configuration file at a configuration file location known to the resource discovery aggregator, the configuration file containing a resource discovery document location, one or more transport modes, comprising a pull transport mode, supported by the corresponding resource discovery aggregator, and a plurality of access strategies for each of at least one of the one or more resource discovery documents, each access strategy including security information to be used when accessing a corresponding resource discovery document, the resource discovery aggregator using the configuration file location to access the one or more resource discovery documents at one or more document locations different than the configuration file location, each resource discovery document indicating one or more capabilities of the corresponding resource discovery provider, the resource discovery aggregator being a different entity than the one or more resource discovery providers;
   the configuration file location including a uniform resource identifier (URI);
   storing, at the resource discovery aggregator, information from the one or more resource discovery documents;
   receiving, from a resource discovery consumer, a request for capability information;
   in response to the receiving, retrieving the capability information from the stored information; and sending the capability information to the resource discovery consumer.

6. The method of claim 5, wherein the one or more capabilities includes metadata indicating application program interface capabilities of the corresponding resource discovery provider.

7. The method of claim 6, wherein the application program interface capabilities includes one or more tenant-specific customizations of application program interfaces of the corresponding resource discovery provider.

8. The method of claim 5, wherein at least one of the resource discovery providers is also a resource discovery aggregator.

9. A non-transitory machine-readable medium storing instructions which, when executed by one or more processors, cause the one or more processors to perform operations comprising:
  accessing, at a resource discovery aggregator, one or more resource discovery documents hosted by one or more resource discovery providers, each of the one or more resource discovery providers exposing a configuration file at a configuration file location known to the resource discovery aggregator, the configuration file containing a resource discovery document location, one or more transport modes, comprising a pull transport mode, supported by the corresponding resource discovery aggregator, and a plurality of access strategies for each of at least one of the one or more resource discovery documents, each access strategy including security information to be used when accessing a corresponding resource discovery document, the resource discovery aggregator using the configuration file location to access the one or more resource discovery documents at one or more document locations different than the configuration file location, each resource discovery document indicating one or more capabilities of the corresponding resource discovery provider, the resource discovery aggregator being a different entity than the one or more resource discovery providers;
  the configuration file location including a uniform resource identifier (URI);
  storing, at the resource discovery aggregator, information from the one or more resource discovery documents;
  receiving, from a resource discovery consumer, a request for capability information;
  in response to the receiving, retrieving the capability information from the stored information; and
  sending the capability information to the resource discovery consumer.

10. The non-transitory machine-readable medium of claim 9, wherein the one or more capabilities includes metadata indicating application program interface capabilities of the corresponding resource discovery provider.

11. The non-transitory machine-readable medium of claim 10, wherein the application program interface capabilities includes one or more tenant-specific customizations of application program interfaces of the corresponding resource discovery provider.

12. The non-transitory machine-readable medium of claim 9, wherein at least one of the resource discovery providers is also a resource discovery aggregator.

13. A system comprising:
  at least one hardware processor; and
  a computer-readable medium storing instructions that, when executed by the at least one hardware processor, cause the at least one hardware processor to perform operations comprising:
  accessing, at a resource discovery aggregator, one or more resource discovery documents hosted by one or more resource discovery providers, each of the one or more resource discovery providers exposing a configuration file at a configuration file location known to the resource discovery aggregator, the configuration file containing a resource discovery document location, one or more transport modes, comprising a push transport mode, supported by the corresponding resource discovery aggregator, and a plurality of access strategies for each of at least one of the one or more resource discovery documents, each access strategy including security information to be used when accessing a corresponding resource discovery document, the resource discovery aggregator using the configuration file location to access the one or more resource discovery documents at one or more document locations different than the configuration file location, each resource discovery document indicating one or more capabilities of the corresponding resource discovery provider, the resource discovery aggregator being a different entity than the one or more resource discovery providers;
  the configuration file location including a uniform resource identifier (URI);
  storing, at the resource discovery aggregator, information from the one or more resource discovery documents;
  receiving, from a resource discovery consumer, a request for capability information;
  in response to the receiving, retrieving the capability information from the stored information; and
  sending the capability information to the resource discovery consumer.

14. A method comprising:
  accessing, at a resource discovery aggregator, one or more resource discovery documents hosted by one or more resource discovery providers, each of the one or more resource discovery providers exposing a configuration file at a configuration file location known to the resource discovery aggregator, the configuration file containing a resource discovery document location, one or more transport modes, comprising a push transport mode, supported by the corresponding resource discovery aggregator, and a plurality of access strategies for each of at least one of the one or more resource discovery documents, each access strategy including security information to be used when accessing a corresponding resource discovery document, the resource discovery aggregator using the configuration file location to access the one or more resource discovery documents at one or more document locations different than the configuration file location, each resource discovery document indicating one or more capabilities of the corresponding resource discovery provider, the resource discovery aggregator being a different entity than the one or more resource discovery providers;
  the configuration file location including a uniform resource identifier (URI);
  storing, at the resource discovery aggregator, information from the one or more resource discovery documents;
  receiving, from a resource discovery consumer, a request for capability information;

in response to the receiving, retrieving the capability information from the stored information; and sending the capability information to the resource discovery consumer.

15. A non-transitory machine-readable medium storing instructions which, when executed by one or more processors, cause the one or more processors to perform operations comprising:

accessing, at a resource discovery aggregator, one or more resource discovery documents hosted by one or more resource discovery providers, each of the one or more resource discovery providers exposing a configuration file at a configuration file location known to the resource discovery aggregator, the configuration file containing a resource discovery document location, one or more transport modes, comprising a push transport mode, supported by the corresponding resource discovery aggregator, and a plurality of access strategies for each of at least one of the one or more resource discovery documents, each access strategy including security information to be used when accessing a corresponding resource discovery document, the resource discovery aggregator using the configuration file location to access the one or more resource discovery documents at one or more document locations different than the configuration file location, each resource discovery document indicating one or more capabilities of the corresponding resource discovery provider, the resource discovery aggregator being a different entity than the one or more resource discovery providers;

the configuration file location including a uniform resource identifier (URI);

storing, at the resource discovery aggregator, information from the one or more resource discovery documents;

receiving, from a resource discovery consumer, a request for capability information;

in response to the receiving, retrieving the capability information from the stored information; and sending the capability information to the resource discovery consumer.

* * * * *